(12) United States Patent
Trowbridge

(10) Patent No.: US 12,484,481 B2
(45) Date of Patent: Dec. 2, 2025

(54) HEADLAND GRAIN CAPTURE SEQUENCE FOR AGRICULTURAL VEHICLE HEADER

(71) Applicant: CNH Industrial America LLC, New Holland, PA (US)

(72) Inventor: Jeffrey Trowbridge, Stevens, PA (US)

(73) Assignee: CNH Industrial America LLC (DE)

( * ) Notice: Subject to any disclaimer, the term of this patent is extended or adjusted under 35 U.S.C. 154(b) by 795 days.

(21) Appl. No.: 17/824,044

(22) Filed: May 25, 2022

(65) Prior Publication Data

US 2023/0380347 A1    Nov. 30, 2023

(51) Int. Cl.
A01D 41/14    (2006.01)
A01D 34/28    (2006.01)
A01D 57/04    (2006.01)

(52) U.S. Cl.
CPC ........... *A01D 57/04* (2013.01); *A01D 34/283* (2013.01); *A01D 41/141* (2013.01)

(58) Field of Classification Search
CPC .................... A01D 57/02; A01D 57/04; A01D 41/00–41/16; A01D 34/283
See application file for complete search history.

(56) References Cited

U.S. PATENT DOCUMENTS

| 4,124,970 | A | 11/1978 | Bernhardt |
| 7,222,479 | B2 | 5/2007 | Stahl et al. |
| 9,253,943 | B2 * | 2/2016 | Buermann ............. A01D 41/06 |
| 10,349,578 | B2 | 7/2019 | Cook |
| 10,462,968 | B2 | 11/2019 | Shearer |
| 10,820,513 | B2 | 11/2020 | Hunt et al. |
| 2009/0107094 | A1 * | 4/2009 | Bich ..................... A01D 41/141 56/10.2 E |
| 2018/0168101 | A1 * | 6/2018 | Fuchtling ............... A01D 34/28 |
| 2019/0098831 | A1 | 4/2019 | Yanke et al. |
| 2019/0230858 | A1 * | 8/2019 | Shearer ................ A01D 41/141 |
| 2021/0105944 | A1 | 4/2021 | Sudhues et al. |
| 2021/0120734 | A1 | 4/2021 | Reubens et al. |

(Continued)

FOREIGN PATENT DOCUMENTS

AU      2019200889 A1    2/2019
DE    102016118637 A1    4/2018

(Continued)

OTHER PUBLICATIONS

Extended European Search Report for EP Application No. 23174346.8 dated Oct. 23, 2023 (eight pages).

*Primary Examiner* — Joseph M Rocca
*Assistant Examiner* — Madeline I Runco
(74) *Attorney, Agent, or Firm* — Buchanan Ingersoll & Rooney PC

(57) ABSTRACT

A system and method for capturing grain on a header of an agricultural vehicle either before, during or after raising the header in a headland sequence. The header includes (i) a cutter bar, (ii) either an auger or belt positioned adjacent the cutter bar, (iii) a reel positioned at an elevation above the cutter bar, and (iv) a device that is configured to adjust a gap between the reel and the cutter bar. During a harvest mode, the gap is set to a first distance, and, during the headland sequence, the gap is set to a second distance that is less than the first distance. At the second distance, tines on the reel are positioned to sweep crop off the cutter bar toward either the belt or the auger.

9 Claims, 4 Drawing Sheets

(56) References Cited

U.S. PATENT DOCUMENTS

| | | |
|---|---|---|
| 2021/0185876 A1 | 6/2021 | Hunt et al. |
| 2021/0243954 A1 | 8/2021 | Honeyman et al. |
| 2022/0167556 A1* | 6/2022 | Peters .................. A01D 41/127 |
| 2023/0157208 A1* | 5/2023 | Farley .................. A01D 41/141 |
| | | 56/257 |

FOREIGN PATENT DOCUMENTS

| | | |
|---|---|---|
| EP | 2055173 A1 | 5/2009 |
| EP | 3335541 A1 | 6/2018 |
| EP | 4136956 A1 | 2/2023 |
| WO | WO-2021217112 A1 * 10/2021 | ........... A01D 41/141 |

* cited by examiner

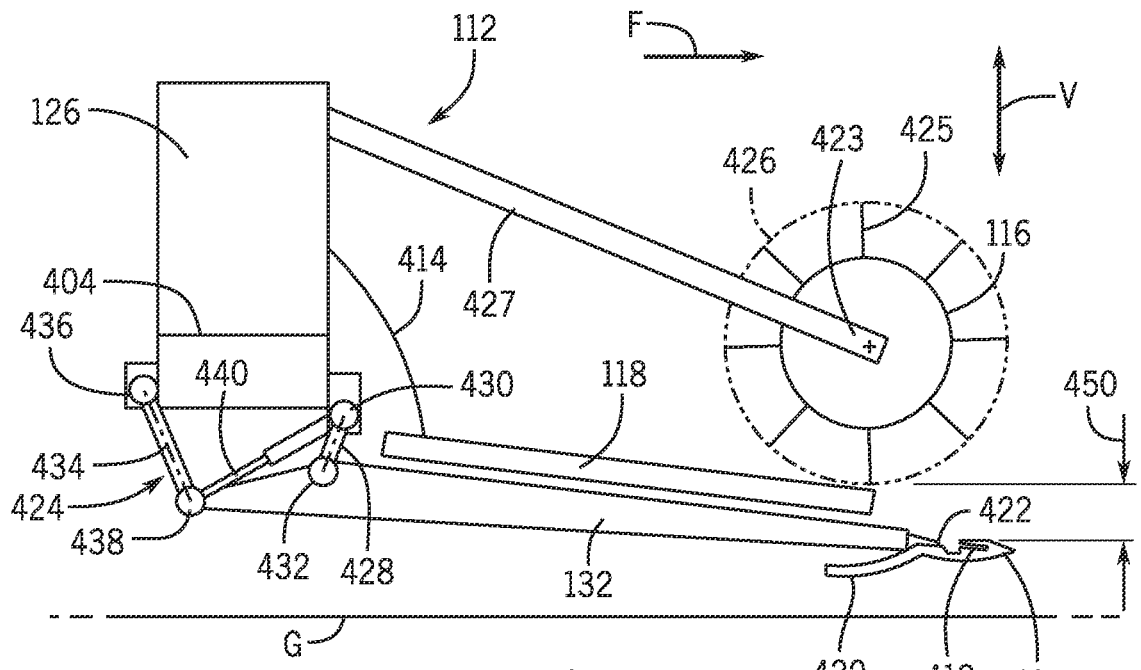
FIG. 4
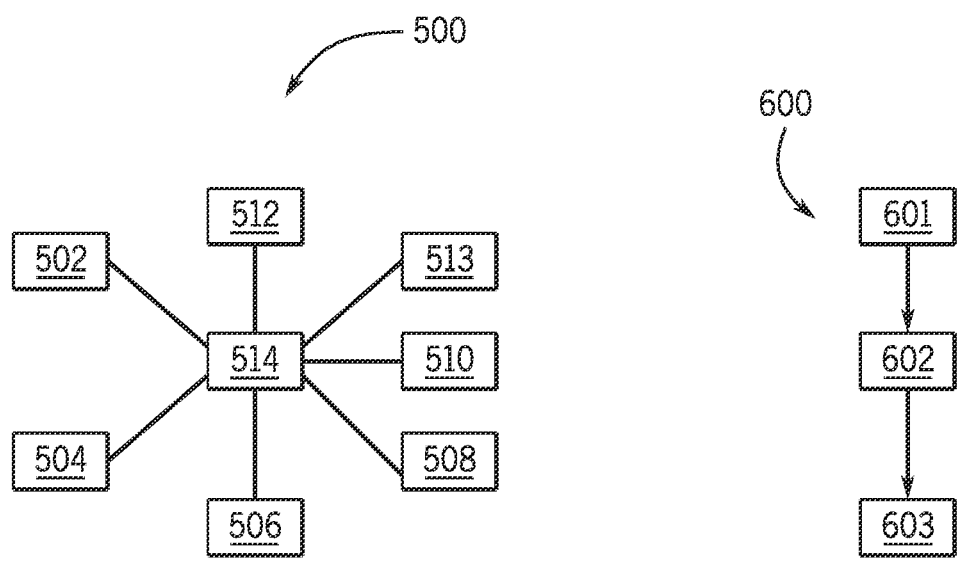
FIG. 5
FIG. 6

HEADLAND GRAIN CAPTURE SEQUENCE FOR AGRICULTURAL VEHICLE HEADER

FIELD OF THE INVENTION

The present invention relates to agricultural harvesters. More specifically, the present invention relates to a header for an agricultural harvester. More specifically, the present invention relates to a method for capturing grain on a header during a headland sequence.

BACKGROUND OF THE INVENTION

When harvesting short crops or in locations with light yield, crop material will tend to build up between the cutter bar and a lateral draper belt of a combine harvester draper header. During a regular harvest, once enough crop collects, the rotating reel of the draper header pushes a stream of crop onto the lateral draper belt. One challenge is that during a headland sequence, when the combine reaches the headland (i.e., the boundary of the field) and the header is raised and no further crop stream is being pushed onto the draper belt, the crop material (along with its valuable grain) residing on the cutter bar can fall off of the cutter bar and onto the ground. In view of the foregoing, it would be desirable to provide a system to capture the crop material residing on the cutter bar for processing by the combine immediately prior to raising the header during the headland sequence.

SUMMARY OF THE INVENTION

According to one aspect of the invention, a system and a method for capturing grain on a header of an agricultural vehicle either prior to, during or after raising the header during a headland sequence are provided. The header includes (i) a cutter bar, (ii) either an auger or belt positioned adjacent the cutter bar, (iii) a reel positioned at an elevation above the cutter bar, and (iv) a device that is configured to adjust a gap between the reel and the cutter bar. During a harvest mode, the gap is set to a first distance, and, during the headland sequence, the gap is set to a second distance that is less than the first distance. At the second distance, tines on the reel are positioned to sweep crop off the cutter bar toward either the belt or the auger.

The method includes the step of adjusting a gap between the reel and the cutter bar from a first distance corresponding to a harvest mode to a second distance corresponding to a headland mode, wherein the second distance is less than the first distance, wherein, at the second distance, tines on the reel are positioned to sweep crop off the cutter bar toward either the belt or the auger for capturing grain on the header of the agricultural vehicle prior to raising the header during a headland sequence.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 is a side view of a header illustrating an exemplary embodiment of a cutter bar support linkage.

FIG. 5 is a schematic of a system for capturing grain on a header at the beginning of a headland sequence.

FIG. 6 depicts a flow chart depicting an exemplary method for capturing grain on a header at the beginning of a headland sequence.

DETAILED DESCRIPTION OF THE INVENTION

Figure 1:
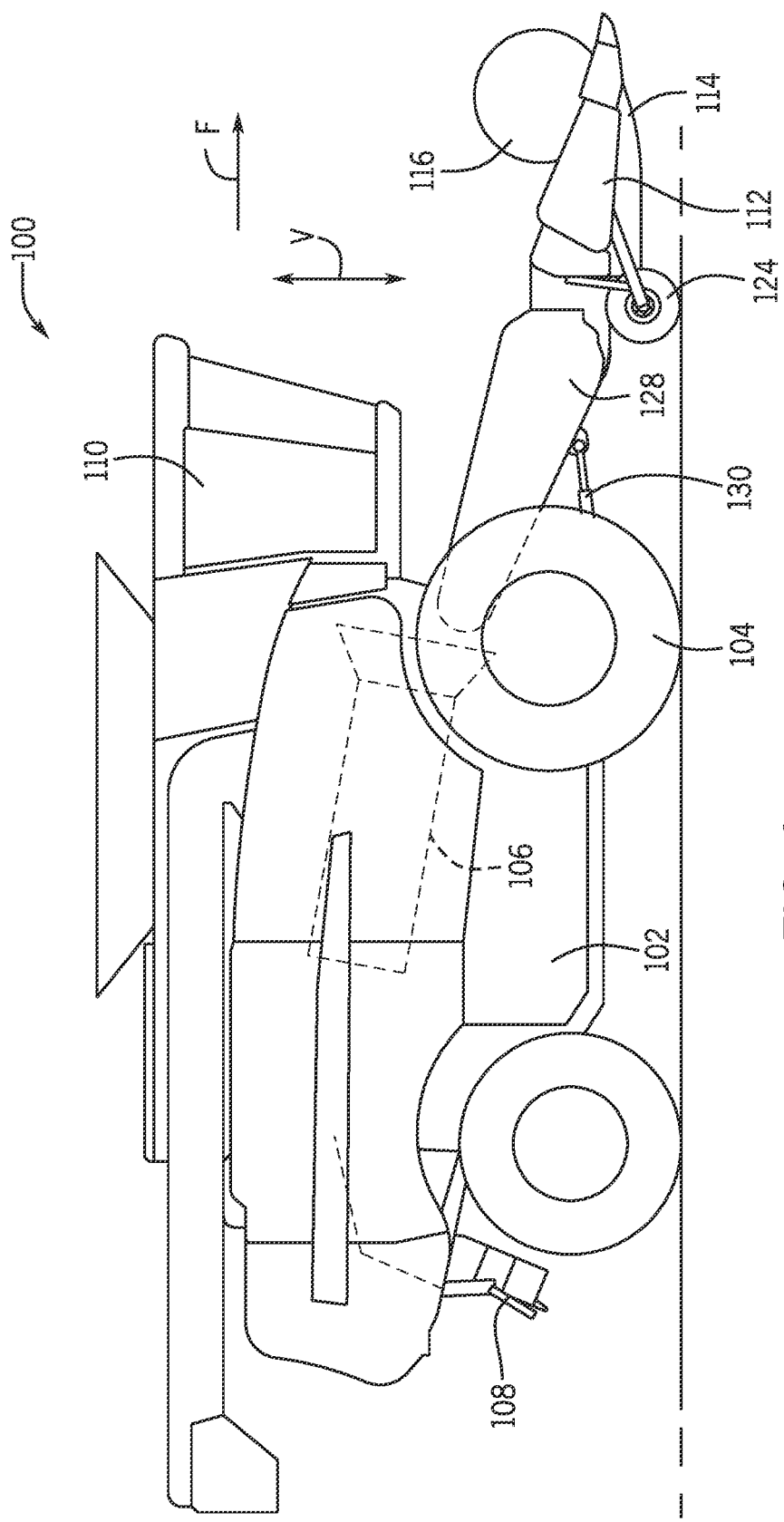
FIG. 1 is an elevational view of an agricultural harvester, which is shown schematically.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "forward" (or fore), "rearward" (or rear or aft), "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream.

Referring now to the drawings, FIG. 1 illustrates an example of an agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well-known in the art, and need not be described in detail herein. The combine 100 also may include other features, such as a spreader 108, operator cab 110, and the like.

Figure 2:
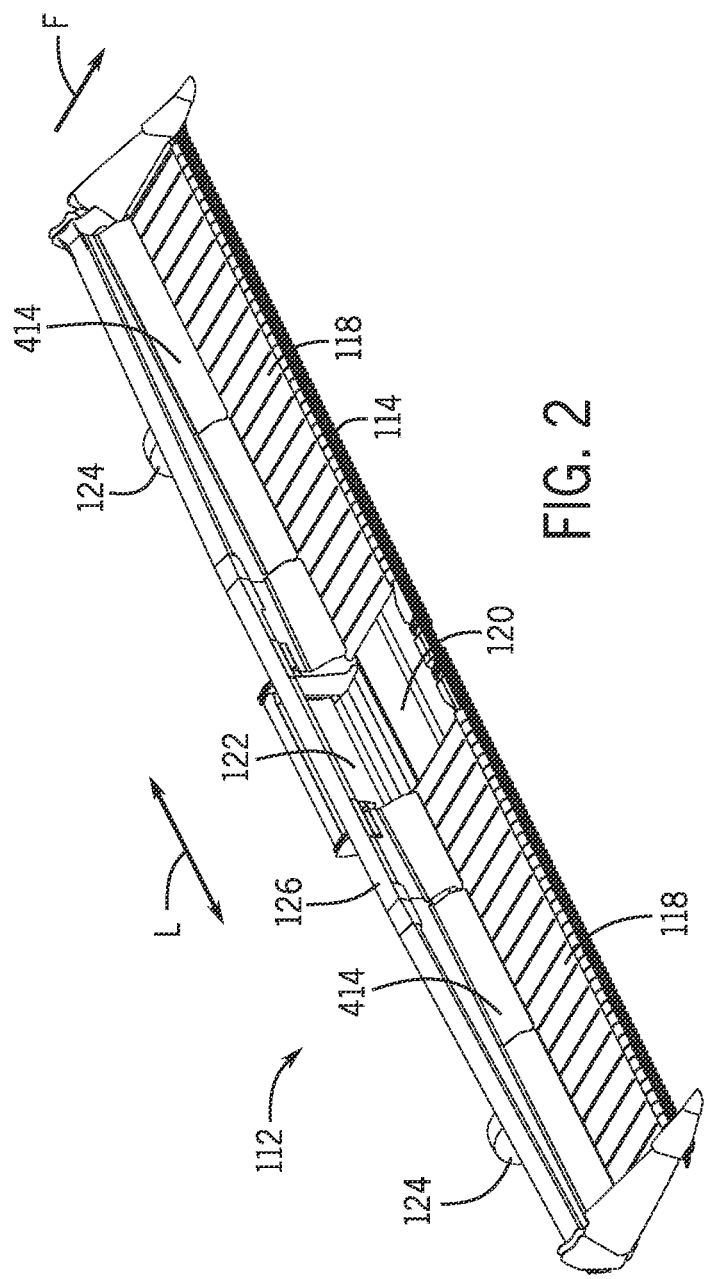
FIG. 2 is an isometric view of the header of the harvester of FIG. 1 (with reel omitted).
Figure 3:
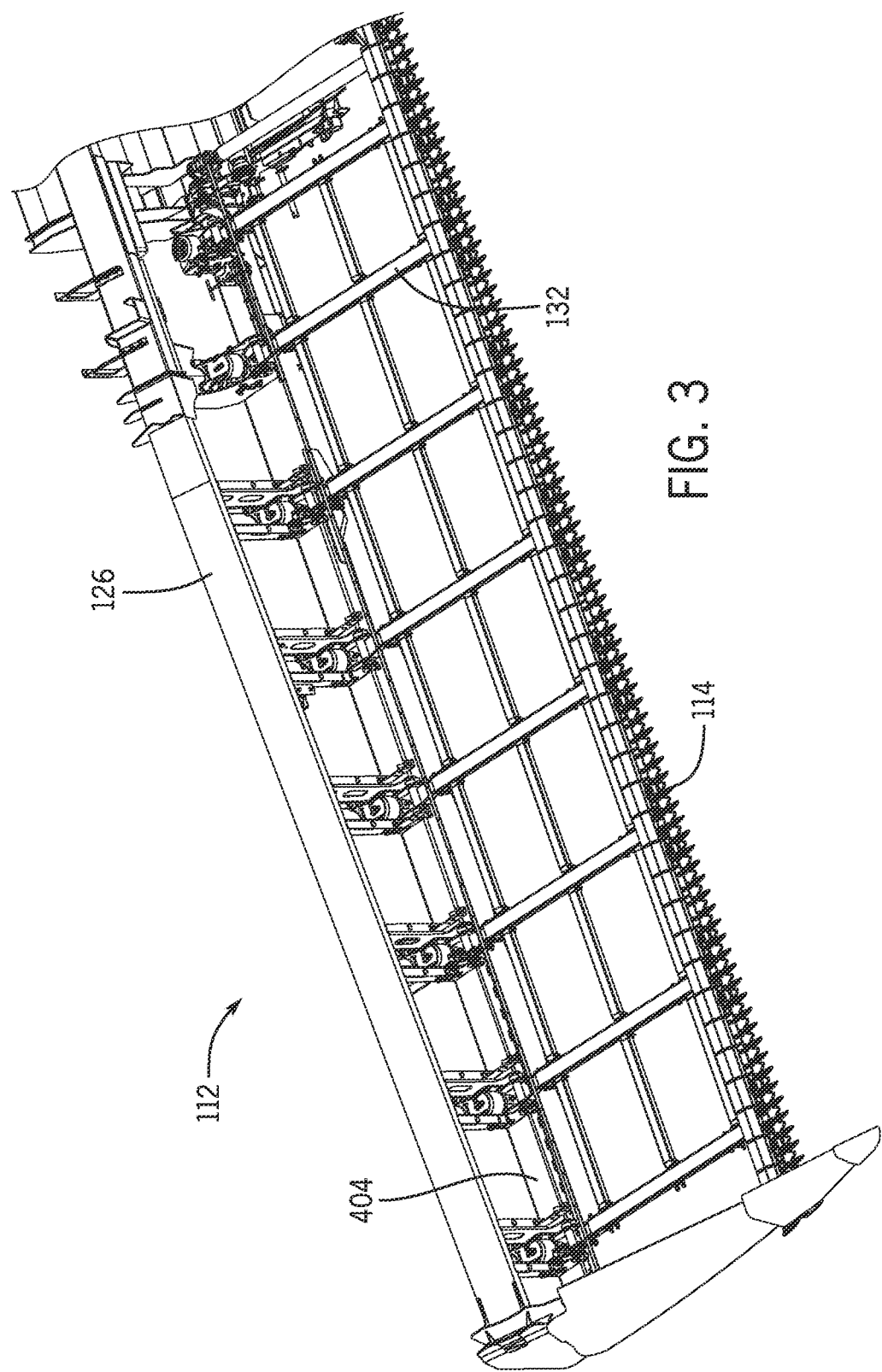
FIG. 3 is an isometric view of a portion of the header frame of FIG. 2.

Referring now to FIGS. 2-4, the combine 100 also includes a header 112, which is configured to cut and harvest crop material from the ground as the combine 100 drives in the forward direction F. The header 112 includes a frame 126. A number of support arms 132 extend forward from the frame 126 to hold parts such as the cutter bar 114, conveyors 118, or the like. The support arms 132 are attached to frame 126 by movable mounts, such as pivots or linkages. In the case of movable support arms 132, a suspension may be used to control the motion of the support arms 132, as will be described later. Alternatively, support arms 132 may be rigidly attached to the header 112.

One or more cutter bars 114 are located at or near the leading edge of the header 112 to cut crops at or near the ground level. The cutter bar 114 may include conventional features such as blade guards 418, a skid shoe 420, and a crop guide plate 422. The cutter bar 114 is movably coupled to the header frame 126 by, for example, a pivotable cutter bar table, to enable the cutter bar 114 to move up/down in a vertical direction. A suitable cutter bar table is disclosed in U.S. Pat. No. 10,349,578, which is incorporated by reference in its entirety and for all purposes.

One or more reels 116 are mounted to frame 126. Each reel 116 is configured to pull the crop material backwards towards the header 112 and feeder 128. Each reel 116 rotates about an axis of rotation 423 and includes a plurality of tines 425 that will grab crop material and direct it toward the cutter bar 114 as the reel 116 rotates about reel axis of rotation 423. The trajectory of the ends of tines 425 is circumscribed by broken line circle 426. The reel 116 is pivotably coupled to the header frame 126 by a reel arm 427 which carries the reel 116. A motor (described later) is provided to adjust the relative positioning of the reel 116 relative to the header frame 126.

The header 112 includes lateral crop conveyors 118 that are configured to move the crop material at the lateral ends of the header 112 in the lateral direction towards the center of the header 112. The crop conveyors 118 may be in the form of belts, auger screws, or the like. At the center, the header 112 includes a feeder conveyor 120 that conveys the crop material backwards towards a crop outlet 122 and feeder 128. It is noted that the conveyors 118 and 120 could be replaced by an auger without departing from the scope or spirit of the invention. The header 112 also may include gauge wheels 124 (FIG. 1) or skids to control the height of the header 112 over the ground G.

The frame 126 has a laterally-extending main truss 404 located at or near the bottom of the frame 126. A backsheet 414 may be mounted to the frame 126 in front of the main truss 404 and at a location to block crop materials from passing beyond the rear edge of the belt 118.

A linkage 424 connects the proximal end of each support arm 132 to the frame 126. The linkage 424 may be configured as a four-bar linkage. For example, the linkage 424 may comprise a front link 428 extending in a first direction from a proximal front pivot 430 on the frame 126 to a distal front pivot 432 on the support arm 132, and a rear link 434 extending in a second direction from a proximal rear pivot 436 on the frame 126 to a distal rear pivot 438 on the support arm 132. The linkage 424 can vary from that which is shown and described. The linkage 424 can vary from that which is shown and described. Various alternative linkages are disclosed in U.S. Patent App. Pub. Nos. 2021/0120734 and 2019/0098831, which are each incorporated by reference in its entirety and for all purposes.

A hydraulic actuator 440 is connected between the frame 126 and either the linkage 424 or support arm 132. The hydraulic actuator 440 may be a conventional telescoping piston and cylinder arrangement, in which pressurized hydraulic fluid is used to control the state of extension of the piston relative to the cylinder. In one state of hydraulic actuator 440, the piston within actuator 440 is permitted to shift within its cylinder. Accordingly, the linkage 424, support arm 132 and cutter bar 114 are also permitted to move or "float" when external forces are applied to the skid shoe 420. This state may also be referred to as a flex mode. In another state of hydraulic actuator 440, the piston is prevented from shifting within its cylinder, which prevents the linkage 424 from moving. Accordingly, support arm 132 and cutter bar 114 are in their fully raised position and also prevented from moving relative to the frame 126. This state may be referred to as a rigid mode.

As background to the different modes, when harvesting some crops in some field conditions, it is desirable to position the cutter bar in a rigid mode, with the cutter bar more or less rigid across the width of the machine and at a fixed orientation relative to the ground surface. Under other crop and/or field conditions it can be preferred to use a flex mode in which the cutter bar follows the ground and floats over the field surface. On wide headers, sections across the width of the cutter bar can move somewhat independently relative to other sections, to move up or down, forward or back and/or tilt side to side in response to field surface conditions. Some harvesting heads for agricultural harvesters can be operated selectively in either the rigid mode or in the flex mode.

As noted above in the background section, one challenge to maximizing harvesting efficiency is that during a headland sequence, when the combine reaches the headland and the header is raised and no further crop stream is being pushed onto the draper belt, the crop material residing on the cutter bar 114 can fall off of the cutter bar 114 and onto the ground resulting in a harvesting inefficiency. In view of the foregoing, it would be desirable to provide a system to capture the crop material residing on the cutter bar 114 for processing by the combine immediately prior to raising the header during the headland sequence.

Turning now to FIG. 5, header 112 (and/or combine 10) includes a system 500 for capturing grain on a header immediately prior to raising the header during the headland sequence. The system 500 generally includes (i) a device 502 for switching between the rigid mode and the flex mode of cutter bar 114, (ii) a device 504 for moving reel 116 relative to cutter bar 114, (iii) a device 506 for moving cutter bar 114 relative to reel 116, (iv) a device 508 for rotating reel 116 about its axis 423, (v) a device 510 for oscillating (or otherwise moving) the cutter bar 114 for shearing crop, (vi) an input device 512 for initiating a headland sequence, (vii) a sensor 513 for sensing (either directly or indirectly) a distance between cutter bar 114 and reel 116; AND/OR (viii) a processor/controller 514 for activating/deactivating devices 502, 504, 506, 508 and 510 based upon inputs received from input device 512 and sensor 513. It is noted that system 500 is not necessarily limited to any of its above-listed components.

Device 502 for switching between the flex and rigid modes may include one or more valves that are connected to the hydraulic lines of hydraulic actuator 440. In one state of those valve(s), the piston of actuator 440 is prevented from shifting within its cylinder, which prevents the linkage 424, support arm 132 and cutter bar 114 from moving relative to frame 126. This is the rigid mode of header 112. And, in another state of those valve(s), the piston of actuator 440 is permitted to shift within its cylinder, which permits the linkage 424, support arm 132 and cutter bar 114 to move relative to frame 126. This is the flex mode of header 112. It is noted that various other devices for switching between the rigid mode and the flex mode are known to those skilled in the art, such as mechanical locks, support arm locks, motors, valve arrangements, and so forth.

In the flex mode, cutter bar 114 is permitted to flex downwardly when the entire header 112 is lifted off the ground during a headland sequence. Conversely, in the rigid mode, cutter bar 114 is not permitted to flex downwardly when the entire header 112 is lifted off the ground during the headland sequence. Accordingly, during a headland sequence, the vertical distance 450 (see FIG. 4) separating tines 425 and cutter bar 114 (in flex mode) is greater in flex mode than in rigid mode because, in flex mode, cutter bar 114 is permitted to shift downwardly under its own weight. The vertical distance 450 may also be referred to herein as a gap or a vertical gap. It follows that maintaining cutter bar 114 in rigid mode is one way to reduce the vertical distance 450 separating tines 425 and cutter bar 114.

Devices 504, 506, 508 and 510 may be hydraulic motors, belt driven motors or electric motors, for example, that are either directly or indirectly connected to input shafts of the reel arm 427, cutter bar table (not shown, but described above), reel 116, and cutter bar 114, respectively. Input device 512 may be a manually operated switch in the cab of combine 10. Or, input device 512 may be controlled by a computer and automatically activated when the combine approaches the headland (e.g., as sensed by the GPS position of combine 10).

FIG. 6 depicts a flow chart depicting an exemplary method 600 for capturing grain on header 112 at the beginning of a headland sequence using system 500. According to method 600 of using system 500, at the beginning of a headland sequence, system 500 performs the following steps: (601) deactivate cutter bar 114 if not already deactivated (to prevent tines 425 from being sheared by a moving cutter bar 114); (602) move reel 116 relatively closer to cutter bar 114 (by moving reel 116 and/or cutter bar 114); and (603) activate reel 116 (if not already activated) to rake or sweep crop residing on cutter bar 114 onto the draper belt(s) 118.

Prior to step 601, the method can further comprise receiving instructions from processor/controller 514 to start a headland sequence.

With regard to step 602 of the above method, i.e., the step of moving reel 116 relatively closer to cutter bar 114, this step may be accomplished by moving reel 116 and/or cutter bar 114 such that the vertical distance 450 therebetween is set to a pre-determined distance (e.g., between 0.1 inches and 1.0 inch). Step 602 may be accomplished in several different ways. In a first example of step 602, a controller activates device 504 to move reel 116 downwards to a location that is closer to cutter bar 114. The location of reel 116 (relative to cutter bar 114 or another point on header) may be sensed by sensor 513 to prevent contact between tines and cutter bar 114. In a second example, cutter bar 114 may be maintained in or moved to a rigid mode, as was discussed above, which results in cutter bar 114 being maintained closer to reel 116. In a third example, a controller activates device 506 to move cutter bar 114 upwards to a location that is closer to reel 116 (while avoiding contact between tines 425 and cutter bar 114). The vertical position of cutter bar 114 may be sensed by sensor 513 to prevent contact between tines 425 and cutter bar 114.

The three examples identified above may all be performed together or in combination to accomplish moving reel 116 relatively closer to cutter bar 114. In other words, the first and second examples may be performed either simultaneously or in series to move reel 116 closer to cutter bar 114; the first and third examples may be performed either simultaneously or in series; the second and third examples may be performed either simultaneously or in series; or the first, second and third examples may be performed either simultaneously or in series.

Movement of the reel 116 in the first example above depends upon the mode setting (e.g., flex or rigid) of cutter bar 114. If cutter bar 114 is maintained in a rigid mode, then reel 116 will be lowered by a lesser degree than if cutter bar 114 were maintained in a flex mode.

Also, reel 116 can have at least four different set positions, which are described hereinafter. In a first set position occurring during a normal harvest and when cutter bar 14 is maintained in a rigid mode, reel 116 is maintained at a first vertical distance 450 from cutter bar 114. In a second set position occurring during a normal harvest and when cutter bar 14 is maintained in a flex mode, reel 116 is maintained at a second vertical distance 450 from cutter bar 114 that is greater than the first vertical distance. In a third set position occurring during a headland sequence and when cutter bar 14 is maintained in a rigid mode, reel 116 is maintained at a third vertical distance 450 from cutter bar 114 that is less than the first vertical distance. In a fourth set position occurring during a headland sequence and when cutter bar 14 is maintained in a flex mode, reel 116 is maintained at a fourth vertical distance 450 from cutter bar 114 that is less than the second vertical distance and greater than the third vertical distance.

Header 112 may be raised after step 603, for example, in preparation for a turn at the headland. Stated differently, steps 601-603 are performed prior to raising header 112 in preparation for a turn at the headland to prevent the loss of grain. Following the turn at the headland, the header 112 is lowered again and cutter bar 114 and/or reel 116 are returned to their initial position(s). The above method can be considered as either constituting or forming part of a headland sequence of the combine. Alternatively, the method could be performed either during or after headland sequence.

This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for capturing grain on a header of an agricultural vehicle before raising the header in a headland sequence, the header including (i) a cutter bar, (ii) either an auger or belt positioned adjacent the cutter bar, and (iii) a reel positioned at an elevation above the cutter bar, said system comprising:
   a device that is configured to adjust a gap between the reel and the cutter bar, wherein, during a harvest mode, the gap is set to a first distance, and, during the headland sequence, the gap is set to a second distance that is less than the first distance, wherein, at the second distance, tines on the reel are positioned to sweep crop off the cutter bar toward either the belt or the auger, wherein the device is configured to adjust the cutter bar between a rigid mode and a flex mode, wherein, during the headland sequence, the device is configured to move the cutter bar to the rigid mode before raising the header during the headland sequence; and
   a computer that is configured to automatically trigger the device to move the cutter bar to the rigid mode when the agricultural vehicle approaches a headland as sensed by a GPS position of the agricultural vehicle.

2. The system of claim 1 further comprising the header.

3. An agricultural vehicle comprising the system of claim 2.

4. The system of claim 1, further comprising a second device configured to move the reel relative to the cutter bar for additionally adjusting the gap between the reel and the cutter bar.

5. The system of claim 1, further comprising a third device configured to move the cutter bar relative to the reel for additionally adjusting the gap between the reel and the cutter bar.

6. The system of claim 1, further comprising a sensor for either directly or indirectly sensing a distance between the cutter bar and the reel.

7. The system of claim 6, further comprising an input device for initiating the headland sequence.

8. The system of claim 7, wherein the computer is configured for activating the device based upon signals received from the input device and the sensor.

9. The system of claim 1 wherein the cutter bar is disposed on an end of a support arm and the support arm is pivotably connected to a frame of the header, and the support arm is prevented from movement relative to the frame of the header when the cutter bar is maintained in the rigid mode.

* * * * *